United States Patent
Malcok et al.

[11] Patent Number: 4,991,475
[45] Date of Patent: Feb. 12, 1991

[54] METHOD AND APPARATUS FOR SAWING BAR-SHAPED WORKPIECES INTO SLICES

[75] Inventors: Hanifi Malcok, Burghausen; Hermann Zwirglmaier, Teising, both of Fed. Rep. of Germany

[73] Assignee: Wacker-Chemitronic Gesellschaft fur Elektronik-Grundstoffe mbH, Burghausen, Fed. Rep. of Germany

[21] Appl. No.: 479,480

[22] Filed: Feb. 13, 1990

[30] Foreign Application Priority Data

Feb. 27, 1989 [DE] Fed. Rep. of Germany ....... 3906091

[51] Int. Cl.$^5$ .................. B23Q 17/09; B23Q 15/12; B24D 5/12; B28D 1/04
[52] U.S. Cl. .................................. 83/13; 51/73 R; 82/118; 82/130; 82/70.2; 125/13.02
[58] Field of Search ............... 83/240, 414, 581, 703, 83/915.5, 617, 72, 74, 75, 13; 125/14, 13.01, 13.02, 13.03; 51/73 R, 165.77, 165.71, 165.8; 82/70.2, 118, 130

[56] References Cited

U.S. PATENT DOCUMENTS

| | | | |
|---|---|---|---|
| 4,377,958 | 3/1983 | Leighton | 83/410.7 |
| 4,502,459 | 3/1985 | Dyer | 125/13.02 |
| 4,537,177 | 8/1985 | Stecre. Jr. et al. | 51/73 R X |
| 4,653,361 | 3/1987 | Zobeli | 125/14 X |
| 4,771,759 | 9/1988 | Zoebeli | 51/73 R X |
| 4,844,047 | 7/1989 | Brehm et al. | 125/13.01 |

Primary Examiner—Hien H. Phan
Assistant Examiner—Kenneth E. Peterson
Attorney, Agent, or Firm—Burgess, Ryan & Wayne

[57] ABSTRACT

The invention is a method and apparatus for sawing bar-shaped workpieces into slices by means of an annular saw. The saw blade deviation, from its nominal position in the axial direction during the sawing operation, is compensated for. According to the invention, the deviation can be compensated for by the workpiece and the clamping system of the saw blade performing an appropriate relative translatory axial movement in accordance with the measured deviation. This movement is conveniently controlled by a computer, which compares the actual and nominal position of the saw blade with one another. The method can be used especially in the sawing of semiconductor bars.

13 Claims, 1 Drawing Sheet

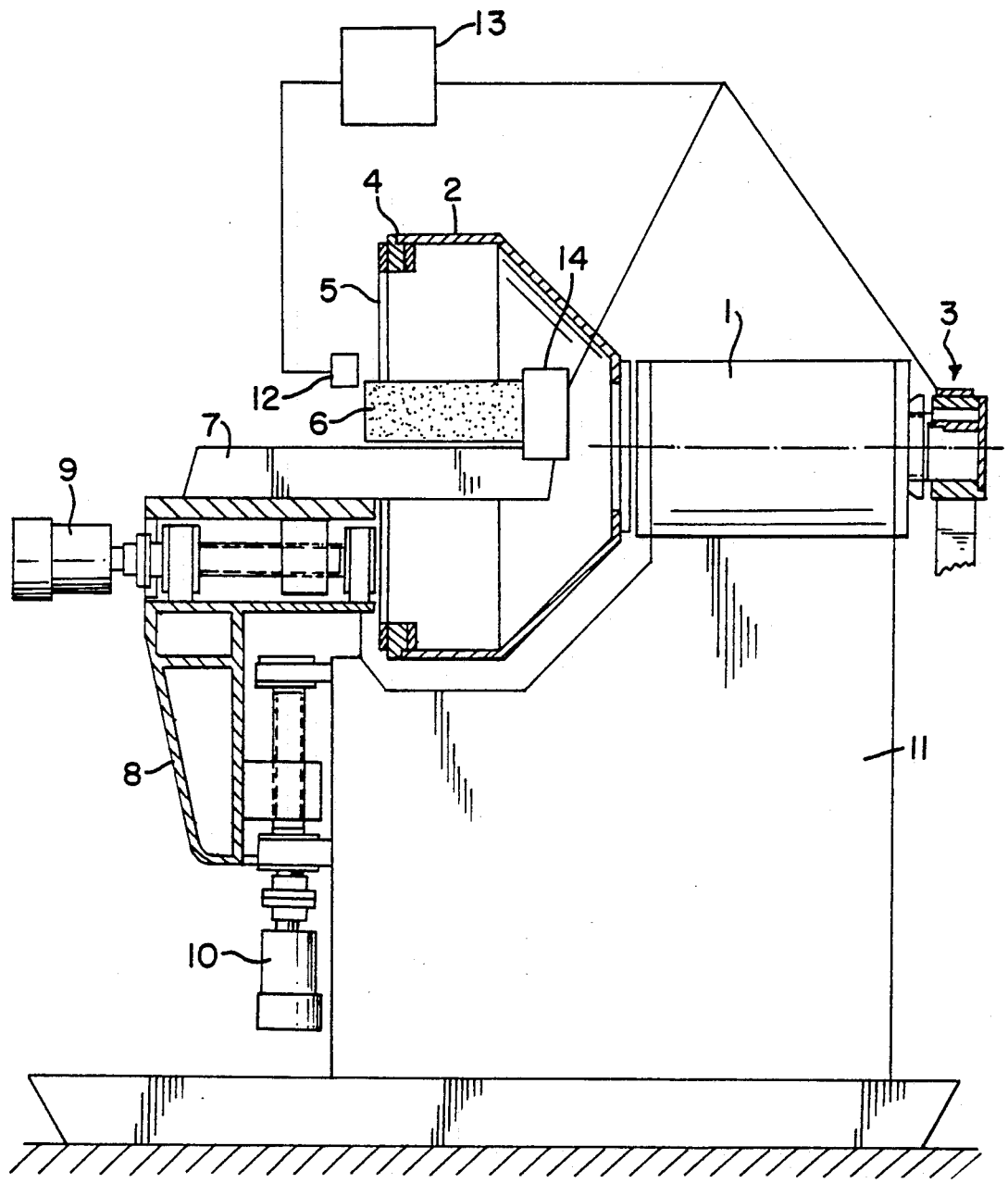

METHOD AND APPARATUS FOR SAWING BAR-SHAPED WORKPIECES INTO SLICES

BACKGROUND OF THE INVENTION

1. Field of the Invention

The invention is a method of sawing bar-shaped workpieces into slices by means of an annular saw. The inner margin of the rotating annular saw blade is set with cutting grains. The rotating saw blade is clamped into a clamping system at its outer periphery and is guided radially through the workpiece held in the cutting position by means of a workpiece holding device. The deviation of the actual position of the saw blade from a nominal position is detected and the relative position of the saw blade and workpiece is adjusted during the sawing operation. The invention also comprises annular saws for performing the method.

To precisely divide bar-shaped workpieces, for example, made of glass, quartz, ceramic or oxidic material, such as ruby or gallium gadolinium garnet or compound semiconductor materials such as gallium arsenide or indium phosphide and, in particular, elementary semiconductor materials as, silicon or germanium into slices, annular saws are used in most cases. Annular saws can provide slices which can meet the often stringent requirements imposed on the geometric quality of the products. Here, circular thin-sheet disks which, concentric to the outer periphery, have a central circular bore, the inner margin of the circular bore serving as a saw blade. The inner peripheral area of the disk is provided with a cutting edge which generally comprises grains of hard material embedded in a bond matrix.

For example, a cutting edge having a drop-shaped cross-section comprising diamond or boron nitride grains embedded in a metal matrix, preferably a nickel matrix, have proved successful for sawing bars of semiconductor material. Bars of silicon have been sawed into thin slices of about 0.1 to 1 mm. thickness for use, for example, in the manufacture of electronic or power components.

The saw blade, at its outer periphery, is clamped into a clamping system. Useful clamping systems are disclosed in accordance with the embodiments described in German Patent No. 3,442,730, U.S. Pat. Nos. 3,039,235, 3,175,548 and German Patent No. 2,841,653. The saw blade is arranged as coaxially and as rotationally symmetric as possible on the sawing machine rotor which, as a rule, is opened out in a cup-like fashion. The workpiece to be sawed, e.g., a silicon bar, is generally fixed in the workpiece holding device by means of an adapter device and is moved via an infeed mechanism into the intended cutting position and held there.

During the sawing operation, the rotating saw blade and the workpiece are subjected to a relative movement, by means of which the cutting edge works radially through the workpiece until finally the desired slice is cut off. In the case of the known annular saws, different variants are used for this purpose. In one embodiment, the workpiece is moved toward the rotating saw blade, and the rotating saw blade remains in a fixed position. In another embodiment, the saw blade is moved through the workpiece mounted in a fixed position; in this embodiment, the workpiece can be located in either a horizontal or a vertical position with the saw blade being correspondingly vertically or horizontally mounted.

In each of these variants, however, apart from the radially directed main cutting force, additional forces directed axially, i.e., perpendicularly to the saw blade plane, generally act on the saw blade during the cutting-off operation. These forces affect its motion in the workpiece and can lead to deviations from the desired cutting line. For example, irregularities in the cutting edge such as, for example, non-uniform wear, varying density in the set cutting grains, non-uniform cutting grain geometry or varying accumulation of removed material on the cutting edge can be possible causes of these forces. In addition, irregular pressing conditions in the sawing gap or displacement of the workpiece or of the sawing machine rotor can also cause these axial forces.

As a result of the deflection of the saw blade, deviations from the shape actually desired appear in the product. If, for example, the saw blade during two successive sawing operations is, in each case, deflected from the ideal position to the same extent, the surfaces of a slice which are produced by these two cuts, are not ideally flat, but are curved in parallel. The slice has no thickness variation but it does have a wrap or a curvature. If the deflections are in opposite directions, slices having a thickness variation result. For characterizing the slices with regard to such geometric errors, standardized test methods have been developed. The method according to the ASTM Standard F 657-80 is useful for determining the values for the warp and/or the bow of a slice. Satisfactory slices may deviate from a predetermined nominal geometry only within narrow tolerance limits. Semiconductor slices for use in the manufacture of electronic especially highly integrated components and, in particular, in photolithographic processes, are subject to particularly strict requirements of the geometric precision.

2. RELATED ART

In the method according to DE-A-3,640,645 (corresponding U.S. Pat. No. 4,844,047), the progress of the cut is monitored by means of measuring devices during the sawing operation and the deviation of the saw blade is counteracted by application of a fluid to at least one side face of the saw blade before entry into the sawing gap. Here, the pressure conditions in the sawing gap change and a force component opposed to the deflecting force is produced so that the nominal cutting line can be maintained more accurately. However, this method is complicated in terms of apparatus and regulating means, especially as these regulating forces produced in a fluid-dynamic manner are, from experience, relatively weak. In addition, the regulating forces only become effective when a certain penetration depth of the saw blade in the material to be sawed is reached.

The object of the invention is a method which is less complicated in terms of regulating means and apparatus, and enables stringent requirements imposed on the geometric quality of the slices to be maintained, even in the case of large slice diameters. Furthermore, it is an object to provide a method which can be used with existing annular saws without expensive conversion. The method permits not only the manufacture of flat slices, but also, such slices having a certain bending (bow) on one or both surfaces. Furthermore, the invention is the annular saws suitable for performing the method.

BRIEF DESCRIPTION OF THE INVENTION

In the method of the invention, the deviation of the saw blade is at least partly compensated by a translatory axial relative movement between the clamping system and the workpiece.

In the method of the invention, the position of the saw-blade clamping plane, i.e., the imaginary plane of the clamping edge of the clamping system, and the workpiece relative to one another in the axial direction, with the rotational axis of the clamping system as a reference axis, is changed in a controlled manner until the actual position, at the location of the cut, deviates from the nominal position, at most, by a permissible tolerance value.

In principle, the translatory axial relative movement can be obtained by movement of the workpiece, by movement of the saw blade or by a combination of these two movements. In most cases, it is sufficient if one of the two possibilities is used, and the combination of movements which is not excluded in principle but is more complicated in terms of regulating means and apparatus, need not be applied.

In general, any type of relative movement requires adequately rigid mounting of the workpiece in order to keep any play in the system which occurs during the sawing operation, as small as possible. Generally, this requirement is fulfilled to a sufficient extent by the conventional work tables since an accurate workpiece position which varies as little as possible, is also essential in the conventional annular blade sawing method.

Furthermore, an important precondition for performing the method according to the invention is to detect the progress of the cut as accurately as possible and to monitor, as accurately as possible, the path of the cutting edge through the workpiece or the deflection of the saw blade during cutting. Measuring devices, by means of which the actual position of the rotating saw blade in the workpiece can be detected, are known and can be used in the method provided they permit sufficiently accurate measurement. Suitable as measuring devices are measuring sensors which enable the respective actual position to be directly detected, i.e., measuring sensors in which the measuring signal is determined through the resulting slice. Measuring sensors in which the measuring signal is received at one or more positions outside the area in which the saw blade engages into the workpiece, and thus, the actual position in the workpiece can be deduced indirectly, are also suitable. Suitable measuring devices are known and are obtainable in the market. Suitable devices use eddy-current sensors, by means of which changes in the distance between sensor and saw blade can be determined by induced currents, and converted into measuring signals. Also, magnetic sensors which determine the strength, varying with the distance, of a magnetic field, for example, via the forces of attraction resulting therefrom, can be used. In principle, light-optical or infrared-optical sensors can be used. When selecting the appropriate measuring system, it may be necessary to take account of the fact that the material to be sawed can also affect the measurement.

In general, however, it must be emphasized that the results achieved are dependent on the accuracy and reliability of determination of the actual position of the saw blade with the measuring sensor selected.

If, in the course of the cutting-off operation, the actual saw blade position determined deviates from the nominal position by more than a permitted tolerance which is established in each case in accordance with the specifications for the slices, the deviation is at least partly compensated for axial movement of the workpiece of the saw blade according to the invention, i.e., until the actual position is again located in the permissible tolerance range surrounding the nominal position. The accuracy with which the predetermined value is followed can be increased to such an extent that the maximum deviations can be maintained in the range of about $+-1$ $\mu$m and less. The measured value which corresponds to the undisturbed saw-blade motion and is measured before the freely rotating saw blade contacts the workpiece is preferably used as an initial value which can also serve as a basis for the zero balance, conveniently carried out before each saw cut between the nominal and actual position.

A deviation discovered in the direction of the slice or bar can then be at least partly compensated according to a variant of the method by the workpiece being made by movement until the actual position of the saw blade is brought into line with the nominal position within the desired tolerance. Since axial translations of a few $\mu$m are, as a rule, sufficient for this movement, only such control elements which permit sufficiently dynamic regulating behavior are suitable for performing these translation movements. In principle, many different systems are conceivable for this purpose such as, for example, a hydraulic, pneumatic, electromotor or mechanical moving means, provided they are capable of the requisite highly accurate positioning. Piezoelectric drive units are preferably used for reasons of the path resolution and displacement velocities which can be obtained. In piezoelectric drive units, the translational movement can be produced and controlled by a change in the applied voltage. Such units are commercially available. They can be conveniently arranged in such a way that they act on the workpiece holding device but leave the workpiece infeed means before each cutting action unaffected.

A second fundamental translational movement adjustment comprised displacing the saw-blade clamping system in a direction opposite to the deflection direction of the saw blade until its actual position is brought into line with the nominal position to the desired extent. This can be done, for example, by moving the entire bearing arrangement of the rotor spindle on the machine bed; by changing the axial bearing gap; or by axially displacing the rotor spindle in the bearing arrangement.

A suprisingly simple means for adjusting the position of the saw blade, preferred within the scope of the invention, is to change, during the sawing operation, the speed with which the spindle rotates in accordance with the deviation. This speed change, via a variation in the centrifugal forces, results in a slight deformation of the clamping system, as well as the rotor carrying the clamping system, which deformation allows the clamping system plus the saw blade to be displaced slightly in the axial direction. Here, when the rotor is at the end of the workpiece, a speed increase, accompanied by a widening of the rotor, allows the saw blade to shift in the direction of the rotor and away from the workpiece, while a decrease in the speed and narrowing of the rotor results in movement in the opposite direction. Thus, if a deflection of the saw blade from the nominal position in the direction of the developing slice is observed, this deflection can be compensated by a reduction in the speed. Equally, a deflection in the direction of the workpiece can be compensated again by increasing the speed.

This method has the advantage that it is particularly easy to master and can be applied to existing machines without considerable effort. The machines, as a rule, generally have means of regulating the speed of the rotor, or can easily be equipped with speed regulation means. With such devices, it is also possible, in principle, to carry out the method manually, provided a suitable measuring system is available. However, the method is preferably performed by computer control wherein, in the present case, it is merely necessary to compare the measured actual value with the predetermined nominal value via an interposed comparison means and to convert the comparison variable resulting therefrom into a control pulse for regulating the speed.

In other variants of the method, the regulation is also preferably carried out by computer control. Here, the measuring signal obtained by comparison of the nominal and actual position are then converted in an analog manner into regulating variables which control the translatory axial movement and, in accordance with which corresponding displacements of the workpiece, the clamping system or a combination of these two means of movement are then performed via the means provided for this purpose. In principle, embodiments of the method are also conceivable in which further regulating means are additionally used such as, for example, control of the saw blade by means of fluid-dynamic force according to DE-A-3,640,645. Periodic resharpening of the saw blade can also be carried out if it can no longer be kept within the predetermined tolerance range by the regulating means. It has been found here that the method according to the invention requires fewer sharpening operations and thus, also permits longer service life of the saw blade in comparison with traditional methods.

The method according to the invention in cooperation with annular saws suitable for the method permit slices, in particular, slices made of semiconductor material, to be sawed with exceptionally high geometric precision. Here, it is possible to achieve favorable values for the variation in thickness and the curvature (warp). It is also possible by the method of the invention to obtain slices having a defined curvature on one side (bow), in which case, it is in particular also possible to specifically cut off such slices in which the convex or concave side points towards the workpiece (positive or negative bow). A considerable advantage results from the fact that the saw blade, during the regulating action, is not positioned in the center position sensitive to axial forces, but in a deflected, virtually biased position which is more stable. A more reliable and more accurate saw-blade guidance is thereby provided which is finally reflected in greater cutting precision.

The invention is described in greater detail below with reference to the exemplary embodiments.

EXAMPLE 1

A commercially available annular saw was equipped with an air-mounted rotor and a clamping system fixed thereon into which a saw blade of rolled steel sheet of about 86 cm. outside diameter and about 30 cm. annular diameter was clamped via a clamping edge by screwing on the outer margin. The inner periphery was provided with a cutting layer of diamond grains embedded in a nickel matrix.

A single crystalline silicon bar (diameter about 15 cm., length about 40 cm.) was adhesively bonded to a carbon cutting strip which served as a sawing aid and by means of an adapter device, was fitted into the workpiece holding device in such a way as to be as free from play and as rigid as possible. The workpiece holding device was mounted on a work table by means of which the silicon bar could be moved into the cutting position intended in each case.

In addition, the annular blade sawing machine had a measuring system which consisted of two eddy-current sensors arranged at the level of the cutting edge and to the side of the workpiece in the entry and exit area of the saw blade; the gap between sensor and saw blade was in each case about 2 mm. Thus, with a sensitivity of $+-1$ $\mu$m, the deviation which occurred in the workpiece between the actual position and the nominal position could be determined indirectly via the externally measured change in position of the saw blade.

The measuring signals were received by a computer and, in accordance with the deviation from the nominal position, were converted into control pulses regulating the speed of the motor, which control pulses increased or decreased the rotational speed of the rotor. It has been determined in preliminary tests that in the present arrangement a change in the speed by about 100 rev/min. corresponded to a displacement of the clamping plane of the saw blade by about 9 $\mu$m, namely, in the direction of the workpiece when the rotation was decreased and in the direction of the slice when the rotation was increased. In the present case, the speed was changed until the actual position of the saw blade corresponded to the nominal position within the measuring accuracy.

Before each sawing operation, the measuring system was "zeroed", i.e., the speed of the saw blade located above the workpiece already fed into the cutting position was set to the standard value of about 1250 rev/min., and the distance resulting therefrom between saw blade and sensor during undisturbed rotation was accepted as an initial value by the computer.

The silicon bar was then advanced radially by the feed device up to the cutting edge, and the actual cutting-off operation began, during which the saw blade, with a cooling lubricant being supplied, worked slowly through the workpiece in accordance with the feed movement until finally a slice was cut off which was removed by means of a pick-up device and passed into a receiving device.

In the sensors, during the cutting-off operation, indicated a deviation of the saw blade from the nominal position, thus in this case, the initially set zero position, the speed of the rotor was changed via the computer, namely, in such a way that the clamping-frame movement caused thereby was opposite to the direction of the saw-blade deflection and until no further deviation between actual and nominal position could be found within the limits of the measuring accuracy. This regulating operation was continued in each case until the slice was cut off. The zero balancing was then carried out again and the next sawing operation could start. Before the next cut, the saw blade was resharpened by briefly sawing into a hard material if the speed had to be changed by more than 200 rev/min. within a sawing operation in order to still compensate for the deviation.

According to this method, a plurality of silicon bars were sawed into a total of over 23,000 slices having a thickness of about 850 $\mu$m. After cleaning, the slice surface was tested for its geometric quality (bow or wrap) with the aid of a commercially available inspection instrument by means of a non-contact capacitive measuring method. In this test, the warp, i.e., the deviation of the slice surface from an ideal center line defining it, was determined as the most meaningful parameter for each slice. The efficiency of a sawing method or of an annular saw can be determined from this, e.g., from the warp values which 97.5% of the slices obtained statistically maintain. In the present case, the corresponding values were determined and recorded.

For comparison, the warp values obtained under production conditions by means of the standard process in the annular blade sawing of bars of the same size, which warp values were likewise statistically achieved or were reached by 97.5% of the same number of slices. Here, the work was carried out without the regulating means according to the invention for compensating for the deviation of the saw blade, but the saw blade was resharpened if it deviated from its initial position by more than the tolerance value deemed to be permissible.

A comparison of the data obtained using both methods showed and the warp value for the slices, which warp value was achieved by 97.5% of the slices, from the sawing method of the invention controlled by means of regulation of the speed was about 10 μm below the value obtained by the unregulated standard process. All slices from the first mentioned method were within the standard tolerance.

Also, about 50% fewer sharpening operations were necessary in the method of the invention.

EXAMPLE 2

In a further series of tests for sawing silicon bars of about 15 cm. diameter, an annular blade sawing machine was used, which was constructed in a manner similar to the machine of Example 1, but with the following modifications:

The workpiece holding device was connected to a piezoelectric drive unit so that the workpiece could perform minimum translatory axial movements toward or away from the saw blade by changing the applied voltage. Furthermore, a magnetic sensor was provided as a measuring sensor (as described in German Patent Application No. P 3,826,698.9) and was attached at the apex level of the annular saw blade. The motion of the saw blade diagonally through the developing slice could be followed from this position during the sawing operation. Deviations of the saw blade from the zero position, which zero position was taken as a basis for the sawing operation, were balanced in a manner similar to Example 1. In each case, before each sawing operation, the zero position was determined with the saw blade undisturbed. The deviations of the saw blade were recorded by a computer via the measuring signals supplied by the sensor and were converted into control signals which changed the voltage applied to the piezoelectric drive unit and thus moved the workpiece in the desired direction.

The actual cutting-off operation was performed in the manner described in Example 1; the speed of the saw blade was set to 1250 rev/min. If the sensor (measuring accuracy about +−1 μm) indicated a deviation of the saw blade, a translatory axial movement of the workpiece in the same direction was, in each case, performed via the control system until the position of the workpiece was brought into line with the position of the saw blade within the measuring accuracy. If the workpiece had to perform a follow-up movement in each case by more than 25 μm, in order to compensate for the deviation, the saw blade, before the subsequent sawing operation, was resharpened by briefly sawing into a hard material.

According to this method, a further 2,000 slices, having a thickness of about 800 μm, were sawed and after cleaning, subjected to a measurement of the warp. The statistical analysis showed that the warp value maintained or reached by 97/5% of the slices corresponded to the value obtained with the speed regulation and was thus, likewise, better by about 10 μm than the comparative value obtained in the conventional unregulated sawing method in Example 1.

The figure shows, in schematic form, an embodiment of an annular saw suitable for carrying out the method of the present invention. It comprises a tubular drive support 1, which passes into a tensioning ring support 2 that widens in the form of a cup. The ring support is driven by drive means 3 and carries a clamping system 4, which is adapted for mounting the saw blade 5. The saw blade rotates about the workpiece 6, e.g., a silicon rod, from which, during the sawing operation, the wafers are separated. The workpiece is fixed by an adapter device (now shown), in the workpiece holding device 7, which is connected via a bracket 8 to a feed device 9 and an advance device 10. The whole arrangement rests on a bench 11 shown here only in schematic form.

During the sawing operation, the cutting edge of the rotating saw blade works radially through the workpiece until the desired wafer is cut off. The deflections of the saw blade from the ideal position occurring during this operation are monitored by the measuring sensor 12, e.g., an eddy current or magnetic sensor, the respective measuring signals being given to a control unit 13. There, the detected actual position of the rotating saw blade is compared with a given nominal position and, in accordance with the deviation, converted into regulating variables controlling the translatory axial relative movement between the saw blade and the workpiece. In accordance with the regulating values, the necessary movement of the workpiece, effected by means of the e.g., piezoelectric drive unit 14, and/or the necessary movement of the saw blade, by means of an increase or decrease of the rotational speed given by drive means 3, are carried out. In most cases, it is not necessary to regulate both the rotational speed and the workpiece position, so that it is in general sufficient to provide only regulating means acting on the workpiece position or on the saw blade rotation to obtain a high cutting accuracy.

What is claimed is:

1. A method for sawing a bar-shaped workpiece into slices, which comprises:
   guiding an annular saw radially through the workpiece comprising a rotatable saw blade having a peripheral surface and an inner cutting edge set with cutting grains, and a blade clamping means for operatively clamping the saw blade on said peripheral surface said workpiece held in a sawing position by a workpiece holding device, while with a longitudinal axis of said workpiece being substantially parallel to a rotary axis of said blade clamping means, and detecting an actual position of the saw blade during the cutting operation;
   determining a deviation of the actual position of the saw blade from a nominal position of the saw blade; and compensating for the deviation by a translatory axial relative movement between the workpiece and the blade clamping means.

2. A method of claim 1, wherein the deviation of the saw blade from the nominal position is compensated for to the extent required to bring the blade position within a set tolerance limit.

3. A method of claim 1, wherein the deviation is compensated for by a translatory axial movement of the clamping means.

4. A method of claim 2, wherein the deviation is compensated for by a translatory axial movement of the clamping means.

5. A method of claim 3, wherein the translatory axial movement of the clamping means is effected by a change in the rotational speed of the saw blade.

6. A method of claim 4, wherein the translatory axial movement of the clamping means is effected by a change in the rotational speed of the saw blade.

7. A method of claim 1, wherein the deviation is compensated for by a translatory axial movement of the workpiece.

8. A method of claim 2, wherein the deviation is compensated for by a translatory axial movement of the workpiece.

9. A method of claim 7, wherein the translatory axial movement of the workpiece is effected by a piezoelectric drive means.

10. A method of claim 8, wherein the translatory axial movement of the workpiece is effected by a piezoelectric drive means.

11. An annular saw comprising:
a rotatable saw blade having a peripheral surface and a blade clamping means operatively clamping the saw blade on said peripheral surface, said blade having an inner cutting edge set with cutting grains, and a workpiece having a longitudinal axis substantially parallel to a rotary axis of the blade clamping means, means of providing a relative translatory axial movement between the blade clamping means and the workpiece, at least one measuring unit for detecting an axial position of the rotatable saw blade, and a control unit for comparing the detected axial position of the rotatable saw balde with a nominal position of the rotatable saw blade to thereby determine a deviation from the nominal position and to control the relative translatory axial movement in response to the deviation during the cutting operation.

12. An annular saw of claim 11, wherein a means for regulating the saw blade rotational speed is the means to provide a relative translatory axial movement.

13. An annular saw of claim 11, wherein a piezoelectric drive unit, acting on the workpiece, is the means to provide a relative translatory axial movement.

* * * * *